UNITED STATES PATENT OFFICE.

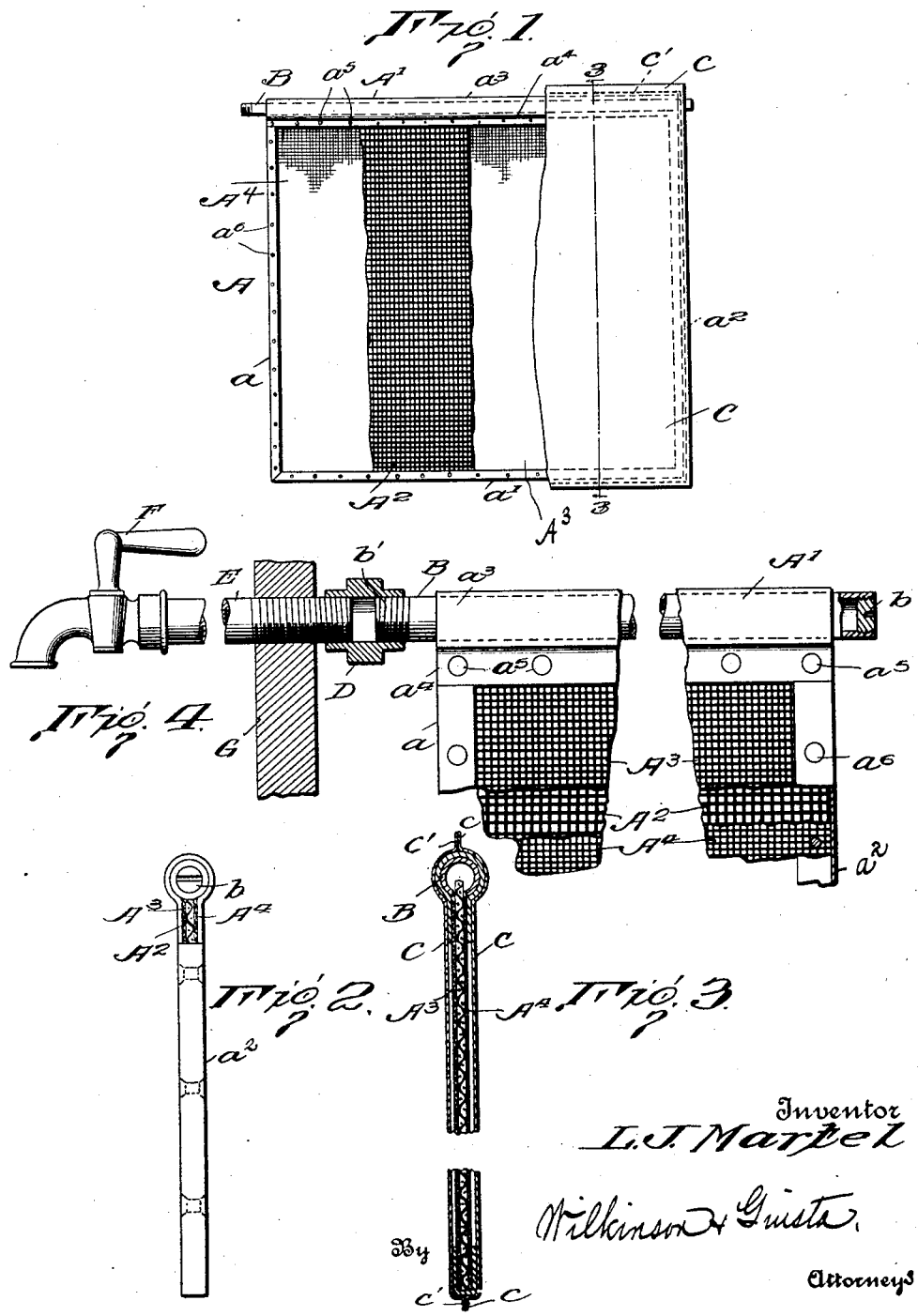

LOUIS J. MARTEL, OF NEW ORLEANS, LOUISIANA, ASSIGNOR TO MARTEL FILTER COMPANY, INC., OF NEW ORLEANS, LOUISIANA, A CORPORATION OF LOUISIANA.

FILTER-FRAME FOR USE WITH PRESSURE-FILTERS.

1,370,470.  Specification of Letters Patent.  Patented Mar. 1, 1921.

Application filed March 11, 1920. Serial No. 364,950.

*To all whom it may concern:*

Be it known that I, LOUIS J. MARTEL, a citizen of the United States, residing at New Orleans, parish of Orleans, and State of Louisiana, have invented certain new and useful Improvements in Filter-Frames for Use with Pressure-Filters; and I do hereby declare the following to be a full, clear, and exact description of the invention, such as will enable others skilled in the art to which it appertains to make and use the same.

My present invention relates to improvements in filtering apparatus for use in the filtering of cane juice and other saccharine solutions, and it consists more especially in providing a filter frame adapted for use in combination with the well known filter cloths, which will continue in operation a long time without becoming clogged up, may be readily washed off when desired without being removed from the receptacle or body in which the frames are mounted, and which, when it is necessary to remove same for purposes of renovation or repair, may be readily and quickly removed.

The invention also provides an independently operated filter frame which may be used entirely independently of all the other filter frames of the apparatus, and which may be cut out of operation whenever desired.

My invention will be more fully understood after reference to the accompanying drawings, in which like parts are indicated by similar reference symbols throughout the several views, and in which:—

Figure 1 shows one of the complete filter frames with the filter cloth applied, parts being broken away for the sake of clearness in the drawings.

Fig. 2 is an end view of the filter frame shown in Fig. 1 as seen from the right of said figure, the filter cloth being removed.

Fig. 3 shows a section along the line 3—3 of Fig. 1, and looking in the direction of the arrows; and Fig. 4 shows the mode of connecting the filter frame to the slotted header which is used for carrying off the liquid filtered through the frame.

The filter frame A consists of the metallic border strips $a$, $a'$ and $a^2$ forming the three sides of a rectangle, the other side of the rectangle being formed by the loop-shaped metal strap A' which has its central portion $a^3$ fitting snugly over the header B. The edges $a^4$ of the strap A' are fastened together by means of the rivets $a^5$ similar to the rivets $a^6$ used in the border pieces $a$, $a'$ and $a^2$. These rivets are preferably countersunk as shown so as not to engage the filter bags or cloth C when the latter is put on, as will be hereinafter described.

Held between the border strips and the strap A' as aforesaid are the three layers of woven wire of copper, the central layer $A^2$ being made of double crimped copper wire of large mesh, preferably about 8 meshes more or less to the inch. This central sheet of heavy double crimped wire serves as a bolster wire to support the two outer layers $A^3$ and $A^4$ which are of much finer mesh, and which are also of copper. These latter may be of about 20 meshes to the inch more or less.

The whole frame includes as a part thereof the suspension tube B which may be closed at one end, as by the screw plug $b$, and the other end may be screw-threaded, as at $b'$, and attached to the union D which is connected to the nipple E, controlled by the cock F, and this nipple is screwed or otherwise secured fast in the end wall of the filter tank or body G, as shown in Fig. 4. The tube B is slotted along its bottom to permit the projection thereinto of the central wire sheet or bolster wire $A^2$.

Before the filter frame is inserted in the filter, the filter cloth C is put on. This cloth is preferably in the form of a bag like a pillowcase, having its bottom and ends closed and the top open. The edges $c$ of this top are sewed together as at $c'$, see Fig. 3, after the filter cloth is put in place and before the filter frame is mounted in the tank or body with the other frames therein contained.

The herein described filter frame is adapted for use in any suitable type of filter tank or body, such, for instance, as is shown in my application, Serial No. 330,361, filed October 13, 1919, and entitled Improvements in apparatus for filtering saccharine solutions, and in the instant case I make no special claim to the construction of the filter body *per se*, but only to the frame and attachments thereof.

It will be obvious that various modifications in the construction, combination and arrangement of parts might be made which could be used without departing from the spirit of my invention; and I do not mean to limit the invention to such details except as particularly pointed out in the claims.

Having thus described my invention what I claim and desire to secure by Letters Patent of the United States is:—

1. A filter frame for use in apparatus of the character described, comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a series of woven wire sheets held in said border plates and said head plate, one of said sheets projecting into the longitudinal slot in said tube.

2. A filter frame for use in apparatus of the character described, comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a central sheet of coarse mesh woven wire faced on opposite sides with sheets of fine mesh woven wire, held in said border plates and in said head plate and registering with the slot in said supporting tube.

3. In a compression filter, the combination with a filter frame comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a series of woven wire sheets held in said border plates and said head plate, one of said sheets projecting into the longitudinal slot in said tube, of a filter bag made of heavy textile fabric inclosing said frame all except the free ends of said supporting tube.

4. In a compression filter, the combination with a filter frame comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a central sheet of coarse mesh woven wire faced on opposite sides with sheets of fine mesh woven wire, held in said border plates and in said head plate and registering with the slot in said supporting tube, of a filter bag made of heavy textile fabric inclosing said frame all except the free ends of said supporting tube.

5. In a compression filter, the combination with a filter frame comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a series of woven wire sheets held in said border plates and said head plate, one of said sheets projecting into the longitudinal slot in said tube, of a filter bag made of heavy textile fabric inclosing said frame all except the free ends of said supporting tube, a nipple projecting from the end wall of the filter body and a union for detachably connecting the supporting tube to the nipple.

6. In a compression filter, the combination with a filter frame comprising sheet metal border strips for the bottom and sides thereof, and a sheet metal head plate bent to form a substantially U-shaped strap mounted at the top of said frame, a longitudinally slotted supporting tube mounted in said U-shaped head plate and projecting beyond the ends of said plate, and a central sheet of coarse mesh woven wire faced on opposite sides with sheets of fine mesh woven wire, held in said border plates and in said head plate and registering with the slot in said supporting tube, of a filter bag made of heavy textile fabric inclosing said frame all except the free ends of said supporting tube, a nipple projecting from the end wall of the filter body, and a union for detachably connecting the supporing tube to the nipple.

LOUIS J. MARTEL.